United States Patent
Ogino

[11] Patent Number: 6,144,805
[45] Date of Patent: *Nov. 7, 2000

[54] OPTICAL APPARATUS FOR CORRECTING FOCUS DETECTION CAUSED BY ENVIRONMENTAL VARIATION

[75] Inventor: Shigeru Ogino, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/967,216

[22] Filed: Oct. 29, 1997

Related U.S. Application Data

[63] Continuation of application No. 08/504,788, Jul. 20, 1995, abandoned.

[30] Foreign Application Priority Data

Jul. 26, 1994 [JP] Japan .................................. 6-193723

[51] Int. Cl.[7] ........................... G03B 17/00; G03B 13/00
[52] U.S. Cl. ................................. 396/81; 396/82; 396/97
[58] Field of Search ........................... 396/72, 79, 80–82, 396/85, 87, 89, 90, 91, 93, 97

[56] References Cited

U.S. PATENT DOCUMENTS

| | | |
|---|---|---|
| 4,920,369 | 4/1990 | Kaneda et al. ........................ 354/400 |
| 4,982,216 | 1/1991 | Kudo et al. .............................. 354/400 |
| 5,124,738 | 6/1992 | Yamashita ............................... 354/402 |
| 5,412,448 | 5/1995 | Kunishige ................................ 354/400 |

FOREIGN PATENT DOCUMENTS

| | | |
|---|---|---|
| 0 294 005 | 12/1988 | European Pat. Off. . |
| 59-133511 | 7/1984 | Japan . |
| 61-133912 | 6/1986 | Japan . |
| 4-043310 | 2/1992 | Japan . |
| 5-038196 | 2/1993 | Japan . |
| 6-82374 | 3/1994 | Japan . |
| 6-102236 | 4/1994 | Japan . |
| 7-270674 | 10/1995 | Japan . |
| 7-287162 | 10/1995 | Japan . |
| 2 141 260 | 12/1984 | United Kingdom . |

Primary Examiner—David M. Gray
Attorney, Agent, or Firm—Fitzpatrick, Celia, Harper & Scinto

[57] ABSTRACT

An optical apparatus includes first and second lenses, first and second detection devices, and a control device. The first lens varies magnification, and the second lens, positioned on a focal-plane side of the first lens, corrects variation of an image forming position. The first detection device detects at least one of temperature and humidity. The second detection device detects positions of the first and second lenses. The control device controls movement of the second lens during movement of the first lens by using outputs from both the first and second detection devices.

17 Claims, 8 Drawing Sheets

OPTICAL APPARATUS FOR CORRECTING FOCUS DETECTION CAUSED BY ENVIRONMENTAL VARIATION

This application is a continuation of application Ser. No. 08/504,788, filed Jul. 20, 1995, now abandoned.

BACKGROUND OF THE INVENTION

1. Field of the Invention

The present invention relates to an optical apparatus such as a video camera, a silver-halide camera and an electronic still camera and, more particularly, to an optical apparatus capable of correcting focus deviation which occurs due to an environmental variation, in an optical system (photographing optical system) having a moving lens group which moves along its optical axis during focusing or zooming, for example, a photographing optical system such as a single-focal-length lens or a zoom lens.

2. Description of the Related Art

In recent years, in the field of optical apparatuses such as cameras, photographing optical systems are becoming smaller and smaller, and the image sizes of solid-state image sensors are becoming increasingly small in diameter. Plastic materials are widely used as optical materials which constitute part of such a photographing optical system. This is because the use of the plastic materials facilitates the molding of lenses and enables the production of lenses having arbitrary shapes, and also realizes marked cost-effectiveness compared to glass materials. For this reason, lenses made of plastic materials are also widely used for viewfinder systems, infrared active type autofocus units and the like.

However, as compared with inorganic glass materials, such plastic materials have a physical nature easily susceptible to environmental variations. The plastic material has a large coefficient of linear expansion; for example, PMMA (polymethyl methacrylate) which is a plastic material, has a representative value of $67.9 \times 10^{-6}/°C.$, whereas LaK 14 (manufactured by OHARA) which is an inorganic glass has a one-digit smaller representative value of $57 \times 10^{-7}/°C.$ Regarding variations in their indices of refraction with respect to temperature variations, the representative values of PMMA are $1.0–1.2 \times 10^{-4}/°C.$, while the D-line refractive indices of LaK 14 are two digits smaller at $3.9–4.4 \times 10^{-6}/°C.$ As described above, as compared with the inorganic glass material, the plastic material has optical constants (index of refraction, shape, etc.) which exhibit great variations with respect to temperature variations. Accordingly, lenses made of the plastic material (plastic lenses) show great variations in focal length with respect to temperature variations, as compared with lenses made of the inorganic glass material.

The plastic material has a large coefficient of water absorption compared to the inorganic glass material. For this reason, the optical constants of the plastic lens vary to a great extent with respect to not only temperature variation but also humidity variation, as compared with the lenses made of the inorganic glass material.

In general, if such a plastic lens is employed, a number of problems will arise. For example, if an environmental variation, particularly a temperature or humidity variation, takes place, the optical nature of the plastic lens, such as focal length, varies to a great extent compared to a lens made of the inorganic glass material. In particular, in the case of recent optical apparatuses of reduced size which have a compact photographing optical system, a small solid-state image sensor and high-density constituent elements, the plastic lens will increase the amount of deviation of the image forming plane of the optical system from a predetermined image forming plane by the influence of an environmental variation, such as a temperature or humidity variation.

SUMMARY OF THE INVENTION

An object of the present invention is, therefore, to provide an optical apparatus capable of reducing the error of an image forming position due to environmental variation, such as a temperature variation or a humidity variation.

To achieve the above object, in accordance with a first aspect of the present invention, there is provided an optical apparatus which comprises an image forming optical system having a movable lens for varying an image forming position, a lens driver for causing the movable lens to move along an optical axis of the image forming optical system, a temperature sensor for detecting a temperature relative to the image forming optical system, a memory which stores control data for use in controlling the lens driver in such a manner that the control data respectively correspond to a multiplicity of temperature areas different from one another, and a controller for controlling the lens driver, the controller detecting from among the multiplicity of temperature areas a temperature area which contains the temperature detected by the temperature sensor, and controlling the lens driver by employing the control data which corresponds to the detected temperature area.

In accordance with a second aspect of the present invention, there is provided an optical apparatus which comprises an image forming optical system having a movable lens for varying an image forming position, a lens driver for causing the movable lens to move along an optical axis of the image forming optical system, a humidity sensor for detecting a humidity relative to the image forming optical system, a memory which stores control data for use in controlling the lens driver, in such a manner that the control data respectively correspond to a multiplicity of humidity areas different from one another, and a controller for controlling the lens driver, the controller detecting from among the multiplicity of humidity areas a humidity area which contains the humidity detected by the humidity sensor, and controlling the lens driver by employing the control data which corresponds to the detected humidity area.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
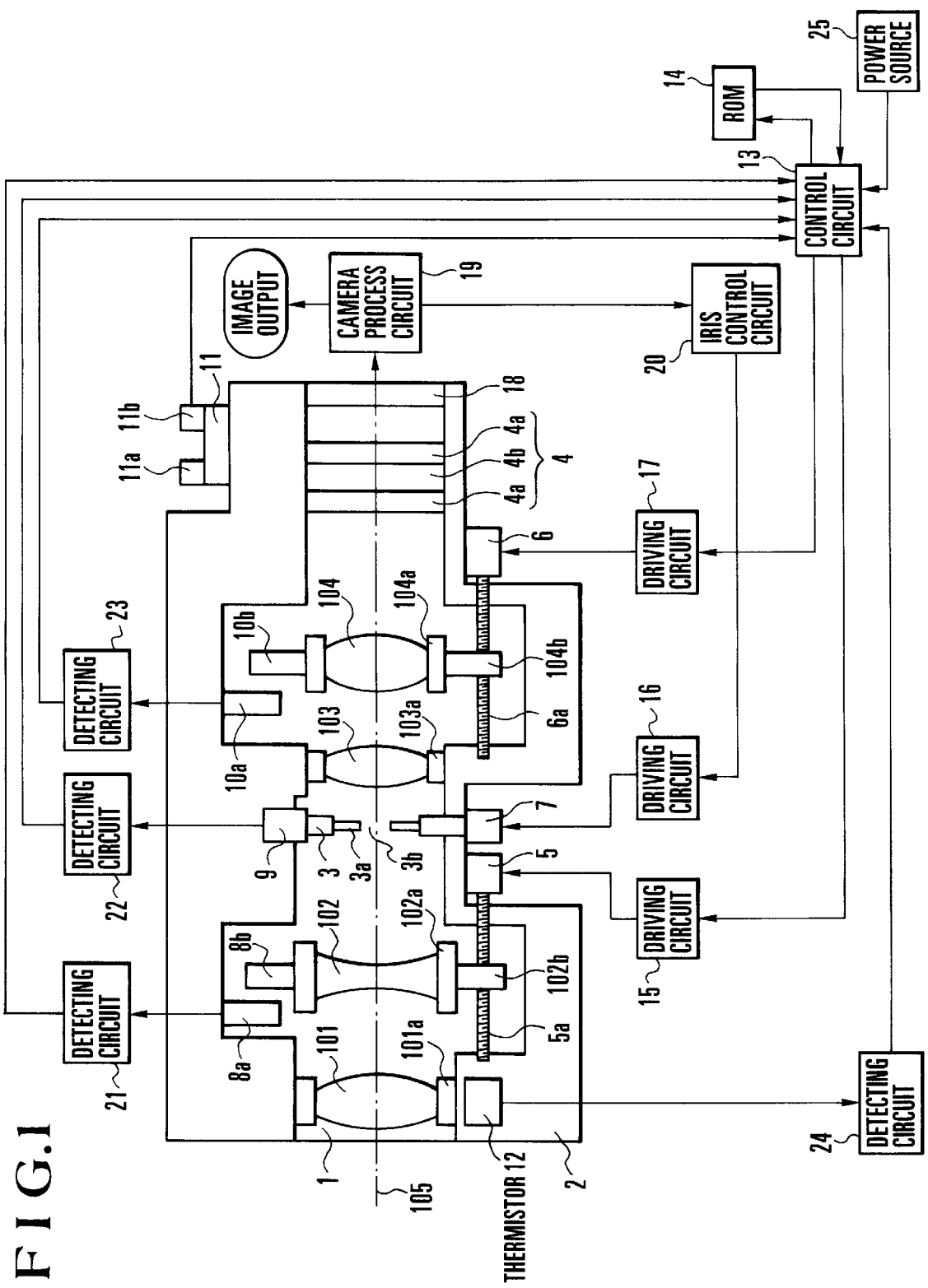
FIG. 1 is a block diagram showing the essential parts of a first embodiment of the present invention.

FIG. 1 is a block diagram showing the essential parts of a first embodiment of the present invention. An optical system 1 is a so-called four-group rear-focus zoom lens (hereinafter referred to as "RFZ lens") which includes four lens groups. The RFZ lens 1 includes a first lens group (hereinafter referred to as "front lens") 101 which is a fixed lens group, a second lens group (hereinafter referred to as "variator lens") 102 which is a moving lens group and has a magnification varying function, a third lens group (hereinafter referred to as "afocal lens") 103 which is a fixed lens group, and a fourth lens group (hereinafter referred to as "RR lens") 104 which is a moving lens group and has a focusing function and a compensation function (which may be called a kind of focusing function) for compensating for a variation of an image plane due to zooming by the variator lens 102.

In practice, in the first embodiment, the RFZ lens 1 has a four-group nine-element lens arrangement, i.e., the front lens 101 includes three lens elements, the variator lens 102 includes three lens elements, the afocal lens 103 includes one lens element and the RR lens 104 includes two lens elements.

In the first embodiment, at least one of the lens groups 101 to 104 uses a plastic lens made of a plastic material. Acrylic material, polyolefin material, polycarbonate material or the like may be employed as the material of the plastic lens.

In the present invention, the plastic lens may be employed in an arbitrarily selected one of the lens groups 101 to 104, or may not at all be employed in any of the lens groups 101 to 104. This is because the focal length of a glass lens also varies with environmental variation.

The shown arrangement also includes a member (hereinafter referred to as "V moving ring") 102a for holding the variator lens 102 and a member (hereinafter referred to as "RR moving ring") 104a for holding the RR lens 104. Each of the moving rings 102a and 104a may be prepared through a molding or cutting process using PC (polycarbonate).

The shown arrangement also includes a member (hereinafter referred to "lens barrel") 2 for holding the aforesaid lens groups 101 to 104. The lens barrel 2 may be prepared through a molding or cutting process using PC (polycarbonate).

In the present invention, it is not necessary to employ particularly limited kinds of materials and processes for preparing the lens barrel 2 and the moving rings 102a and 104a, and materials and processes other than the aforementioned examples may be employed. For example, aluminum may be formed by die casting, or die casting followed by secondary working may be carried out, or an aluminum block may be worked by direct cutting.

In the present invention, the construction of the lens barrel 2 is not limited to a particular one, and the lens barrel 2 may also be formed of a plurality of separate members. For example, the lens barrel 2, which may have a tube- or box-like shape, may be formed of two separate members which are formed in the shape of extending in parallel with or perpendicularly to an optical axis 105 of the RFZ lens 1.

In either case, the lens barrel 2 may also be formed of two or more separate members.

In the first embodiment, the front lens 101 and the afocal lens 103, after they are fixed to the respective holding members 101a and 103a, are fixed to the lens barrel 2 via the holding members 101a and 103a. However, the fixing method is not limited to only this example, and the front lens 101 and the afocal lens 103 may also be directly fixed to the lens barrel 2.

An iris member 3 is provided for adjusting the amount of light of a light flux to be made incident on a photoelectric conversion element 18, such as a CCD. The area of an opening 3b of the iris member 3 is varied by driving iris blades 3a in the iris member 3 in directions approximately perpendicular to the optical axis 105 by driving means 7 of an IG meter (or a stepping motor or the like). An iris encoder 9 is provided for detecting the angle of rotation of the IG meter. To adjust the amount of light of the light flux to be made incident on the photoelectric conversion element 18, an iris control circuit 20 and a driving circuit 16 cause the driving means 7 and the iris encoder 9 to drive the iris blades 3a of the iris member 3, thereby controlling the area of the opening 3b so that the amount of light of such light flux can be kept constant. A detecting circuit 22 is provided for detecting a signal outputted from the iris encoder 9.

Although in the first embodiment the iris member 3 of a mechanical type, the driving means 7 and the iris encoder 9 constitute an iris unit, the construction of the iris unit is not limited to this example only. For example, the iris unit may be formed by a material iris unit having the electrochromic function of controlling its light-absorption action by means of an electrochemical action.

A filter unit 4 is provided in front of the photoelectric conversion element 18, and includes an optical low-pass filter 4a such as quartz, an infrared cut-filter 4b and the like.

In the first embodiment, although each of the filters 4a and 4b is integrally disposed immediately before the photoelectric conversion element 18, they may be disposed as separate members, respectively. The filters 4a and 4b may also be disposed at arbitrary positions where they can serve their respective filter functions for the RFZ lens 1.

Driving means (lens driving means) 5 and 6, such as stepping motors or voice coil motors which generate driving force by electromagnetic force, are provided for driving the variator lens 102 and the RR lens 104, respectively. In the first embodiment, stepping motors are used as the driving means 5 and 6, respectively. Each lead screw 5a and 6a has a surface externally threaded with a predetermined pitch. Racks 102b and 104b may respectively be formed as members integral with or separate from the V moving ring 102a and the RR moving ring 104a. If the racks 102b and 104b are prepared as separate members, they may respectively be integrated with the V moving ring 102a and the RR moving ring 104a, as by adhesion. The racks 102b and 104b are meshed with the lead screws 5a and 6a, respectively, and when the stepping motors 5 and 6 are driven forward or backward, the V moving ring 102a and the RR moving ring 104a move in parallel with the optical axis 105 so that the variator lens 102 and the RR lens 104 move along the optical axis 105.

The shown arrangement also includes photointerrupters 8a and 10a and light blocking plates 8b and 10b. The photointerrupter 8a and the light blocking plate 8b and the photointerrupter 10a and the light blocking plate 10b may respectively be formed as members integral with or separate from the V moving ring 102a and the RR moving ring 104a.

If the photointerrupter 8a and the light blocking plate 8b and the photointerrupter 10a and the light blocking plate 10b are prepared as separate members, they may respectively be integrated with the V moving ring 102a and the RR moving ring 104a, as by adhesion. When the V moving ring 102a and the RR moving ring 104a move and the light blocking plates 8b and 10b reach the positions of the respective photointerrupters 8a and 10a, the output signals from the respective photointerrupter 8a and 10a vary, and these signal variations are detected to determine the reference positions of the variator lens 102 and RR lens 104. Incidentally, the photointerrupter 8a (10a) and the light blocking plate 8b (10b) constitute one element of detecting means for detecting an initial position of the variator lens 102 (the RR lens 104). Detecting circuits 21 and 23 are provided for detecting the output signals from the photointerrupters 8a and 10a, respectively.

Although in the first embodiment the combination of the photointerrupters 8a and 10a and that of the light blocking plates 8b and 10b are adopted as the respective initial-lens-position detecting means, a combination of a Hall element and a magnet, a combination of a PSD (position sensitive detector) and an iRED (infrared light-emitting diode) or other combinations may be adopted.

Driving circuits 15 and 17 are provided for driving the stepping motors (lens driving means) 5 and 6, respectively. A thermistor or thermal resistor 12 serves as temperature detecting means, and a detecting circuit 24 detects a temperature from the thermistor 12 and supplies an output signal corresponding to the temperature to a control circuit 13 which uses a microcomputer or the like. Although the temperature detecting means is hereinafter referred to as the thermistor 12, a thermal resistor may also be used.

In the first embodiment, the thermistor 12 is disposed in the vicinity of the front lens 101. This is because the amount of variation in the focal length of the front lens 101 with respect to temperature variation is calculatedly large compared with the other lens groups. The temperature detecting means (thermistor or thermal resistor) may be disposed in the vicinity of a lens group the focal-length variation of which is dominant over the amount of variation in the focal length of the entire lens.

The shown arrangement also includes a camera process circuit 19 for processing the output signal of photoelectric conversion element 18 and outputting an image signal, a ROM 14 which is memory means in which driving information for the variator lens 102 and the RR lens 104 is stored, and a zoom switch 11 having zooming switches 11a and 11b. If a user desires to execute zooming toward a wide-angle side, the user presses the zooming switch 11a, whereas if the user desires to execute zooming toward a telephoto side, the user presses the zooming switch 11b. If the zoom switch 11 is operated, the variator lens 102 and the RR lens 104 are driven in accordance with driving signals outputted from the control circuit 13, thereby executing a zooming operation. A power source is denoted by reference numeral 25.

The operation of the first embodiment shown in FIG. 1 will be described below.

In order that the RFZ lens 1 can effect zooming while maintaining an in-focus state, the stop position of the RR lens 104 on the optical axis 105 with respect to the stop position of the variator lens 102 on the optical axis 105 is determined for each subject distance.

Figure 2:
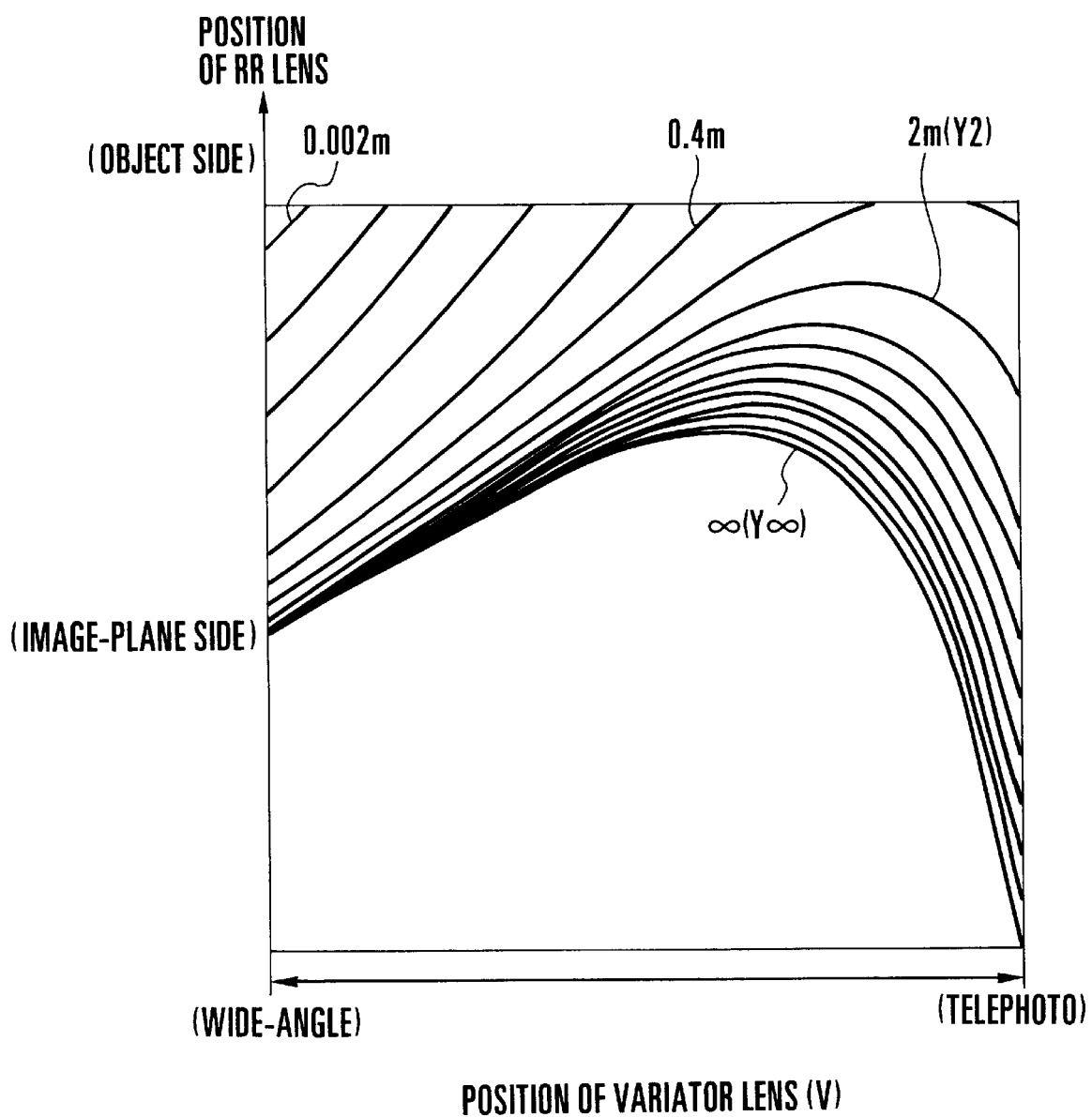
FIG. 2 is an explanatory view of the cam loci of the moving lens groups shown in FIG. 1.

FIG. 2 shows the stop positions (hereinafter referred to as "cam locus") on the optical axis 105 of the variator lens 102 and the RR lens 104 of the RFZ lens 1, which stop positions are plotted for each subject distance.

In FIG. 2, for example if the subject distance is infinity (or 2 m) and the variator lens 102 moves on the optical axis 105 from the wide-angle side to the telephoto side, the RR lens 104 moves on the optical axis 105 toward an object side along a convex locus, as shown by a curve Y∞ (or Y2).

In the first embodiment, during zooming from the wide-angle side to the telephoto side or vice versa, the variator lens 102 and the RR lens 104 are driven and controlled so that the RR lens 104 can trace any of the aforesaid cam loci according to the subject distance. Thus, a good image free from focus deviation can be obtained.

In the first embodiment, the plastic lens is used in at least one lens group. For this reason, if an environmental variation, such as a temperature variation or a humidity variation, occurs around the plastic lens, the shape or the index of refraction of the plastic lens will vary, so that its focal length will vary. Incidentally, in the following description, a temperature variation will be referred to as the environmental variation.

As the focal length of the plastic lens varies, the total focal length of the RFZ lens 1 varies. As a result, the position of an image forming plane at the time of the occurrence of a temperature variation deviates from the position of the image forming plane at a reference temperature Tref (20° C., in the first embodiment), i.e., a focus deviation occurs. Accordingly, if a temperature variation occurs in the case of zooming, it is necessary to correct the shape of the aforesaid cam locus to be traced by the moving lens group, so that the deviation of the image forming plane due to the temperature variation can be corrected.

Figure 3:
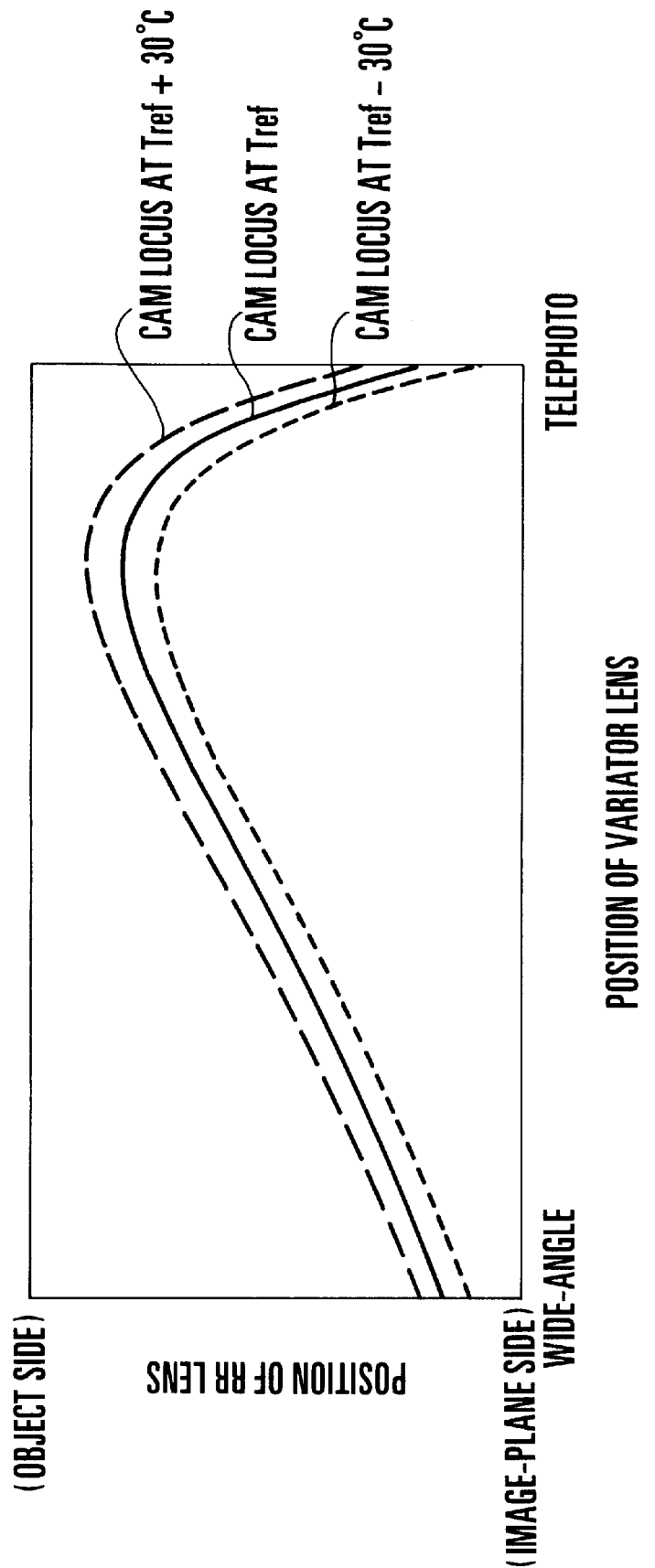
FIG. 3 is an explanatory view showing variations in cam locus with respect to temperature variations.

FIG. 3 shows three different cam loci at the reference temperature Tref=20° C., at a temperature of Tref+30° C. and at a temperature of Tref −30° C., where the subject distance is infinity.

In the first embodiment, in a temperature range higher than the reference temperature Tref, the amount of movement of the RR lens 104 toward the object side is increased, while in a temperature range lower than the reference temperature Tref, the amount of movement of the RR lens 104 toward the object side is decreased.

In the first embodiment, a maximum focus deviation due to the temperature variation occurs at the telephoto end.

Figure 7:
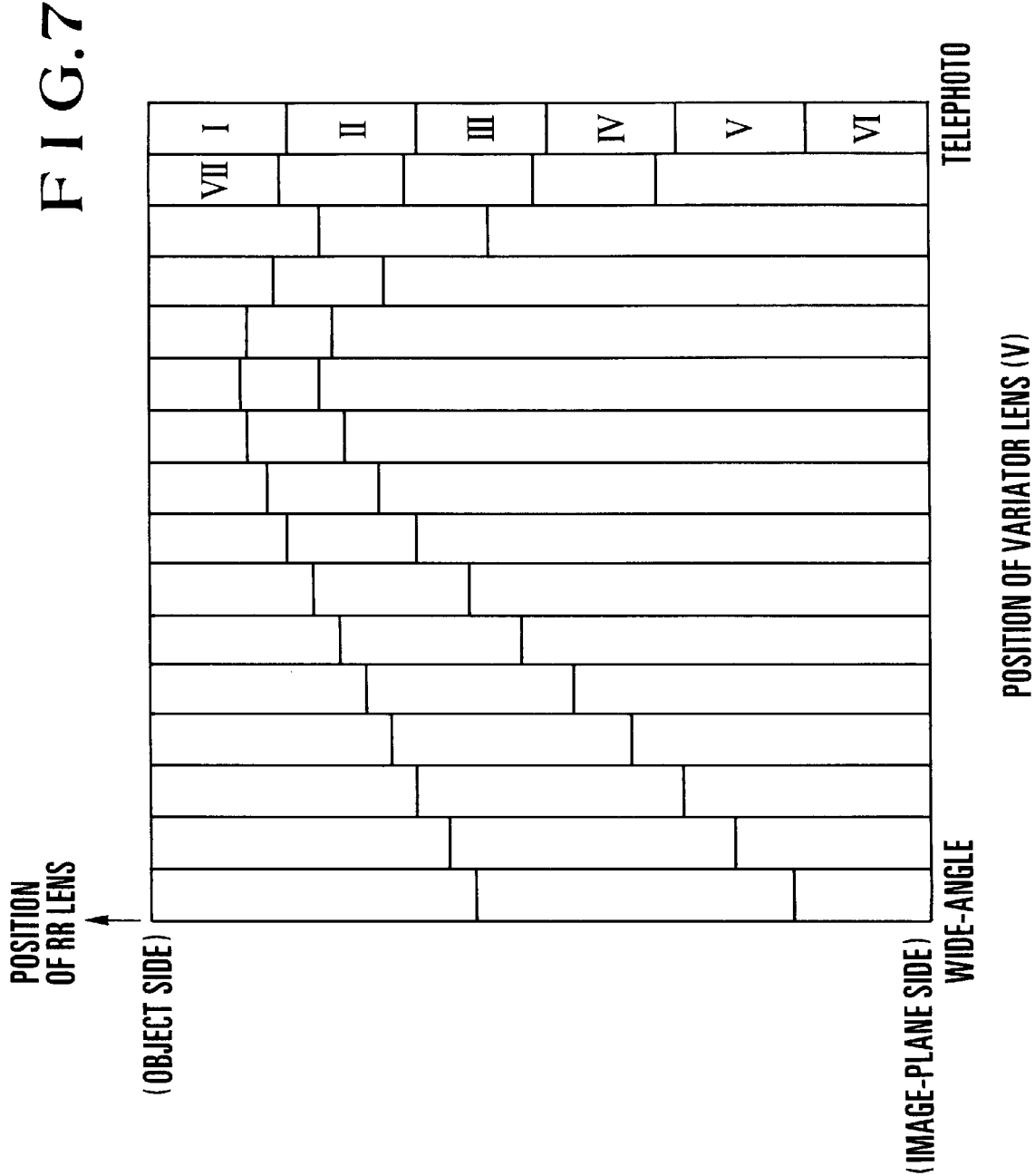
FIG. 7 is an explanatory view showing the manner in which the moving range of each of the moving lens groups is divided into a plurality areas according to the first embodiment of the present invention.

In the first embodiment, as shown in FIG. 7, the moving range of each of the variator lens 102 and the RR lens 104 on the optical axis 105 is divided into a plurality of areas, thereby forming a multiplicity of position areas I to VII. A multiplicity of reference position data (position coordinates in FIG. 7) are stored in advance in the ROM 14 as position-area division data for the variator lens 102 and the RR lens 104. The representative speeds of the variator lens 102 and the RR lens 104, which are driving data for the variator lens 102 and the RR lens 104 during zooming, are stored in advance in the ROM 14 for each of the position areas. When the respective positions of the variator lens 102 and the RR lens 104 are detected, the corresponding position area is determined from the detected positions, and representative speeds corresponding to the position area are read from the ROM 14. The variator lens 102 and the RR lens 104 are respectively driven at the read representative speeds, whereby zooming free from focus deviation can be effected.

In the first embodiment, the aforesaid position-area division data and representative speeds are individually set for each different temperature (area), and its operating temperature area is divided into a multiplicity of partial temperature areas by a predetermined temperature range $\Delta G_T$. Temperature reference position data for the variator lens 102 and the RR lens 104 (the position coordinates of each of the variator lens 102 and the RR lens 104 in FIG. 7) for each of the partial temperature areas and temperature representative speed data for the variator lens 102 and the RR lens 104 for each of the position areas are stored in advance in the ROM 14. Accordingly, if a temperature variation occurs, temperature reference position data corresponding to the resultant partial temperature area is employed to update temperature reference position data for the variator lens 102 and the RR lens 104, the aforesaid position area is determined from the difference values between the current-position data for the variator lens 102 and the RR lens 104 and the corresponding temperature reference position data for the variator lens 102 and the RR lens 104. Temperature representative speed data for the variator lens 102 and the RR lens 104 which correspond to the position area are read from the ROM 14, and the variator lens 102 and the RR lens 104 are driven and controlled on the basis of the read temperature representative speed data.

In the first embodiment, an operating temperature range of −10° C. to +70° C. is divided by a temperature range of 1° C. or more. The temperature reference position data and the temperature representative speed data which are stored in the ROM 14 are corrected data which take account of the above-described influence of focus deviation caused by variations in lens space due to expansions or contractions with a temperature variation of mechanical members which hold the respective lens groups in the RFZ lens 1, or by a variation in the focal length of the plastic lens due to a temperature variation with respect to the reference temperature Tref. Such data are corrected and calculated by taking account of the differences between the temperature detected by the thermistor 12 and the actual temperatures of the plastic lens and the holding members. This is intended to take account of the position of each of the lenses, i.e., the phenomenon in which, for example, a lens or mechanical member disposed near the CCD 18 may exhibit a large temperature rise due to the heat generation of the CCD 18 as compared with, for example, the front lens 101.

Figure 4:
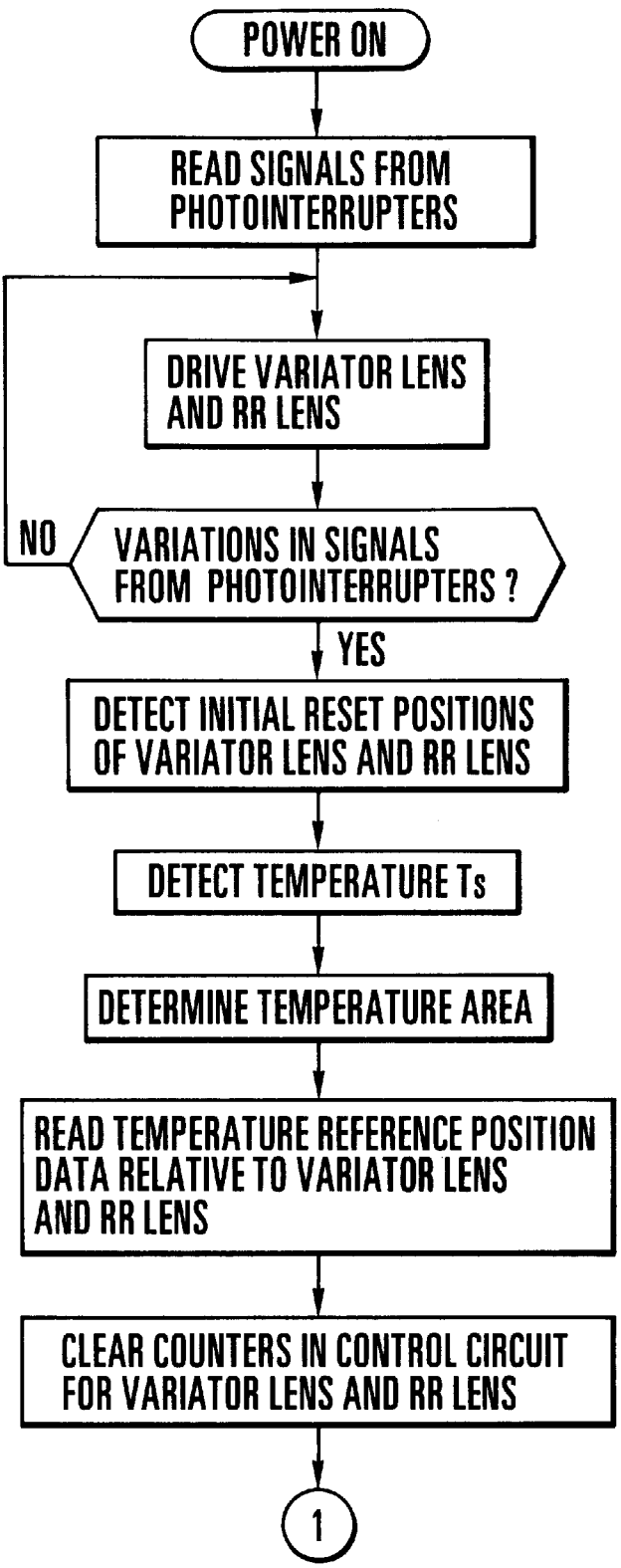
FIG. 4 is a flowchart showing the operation of the first embodiment of the present invention.
Figure 5:
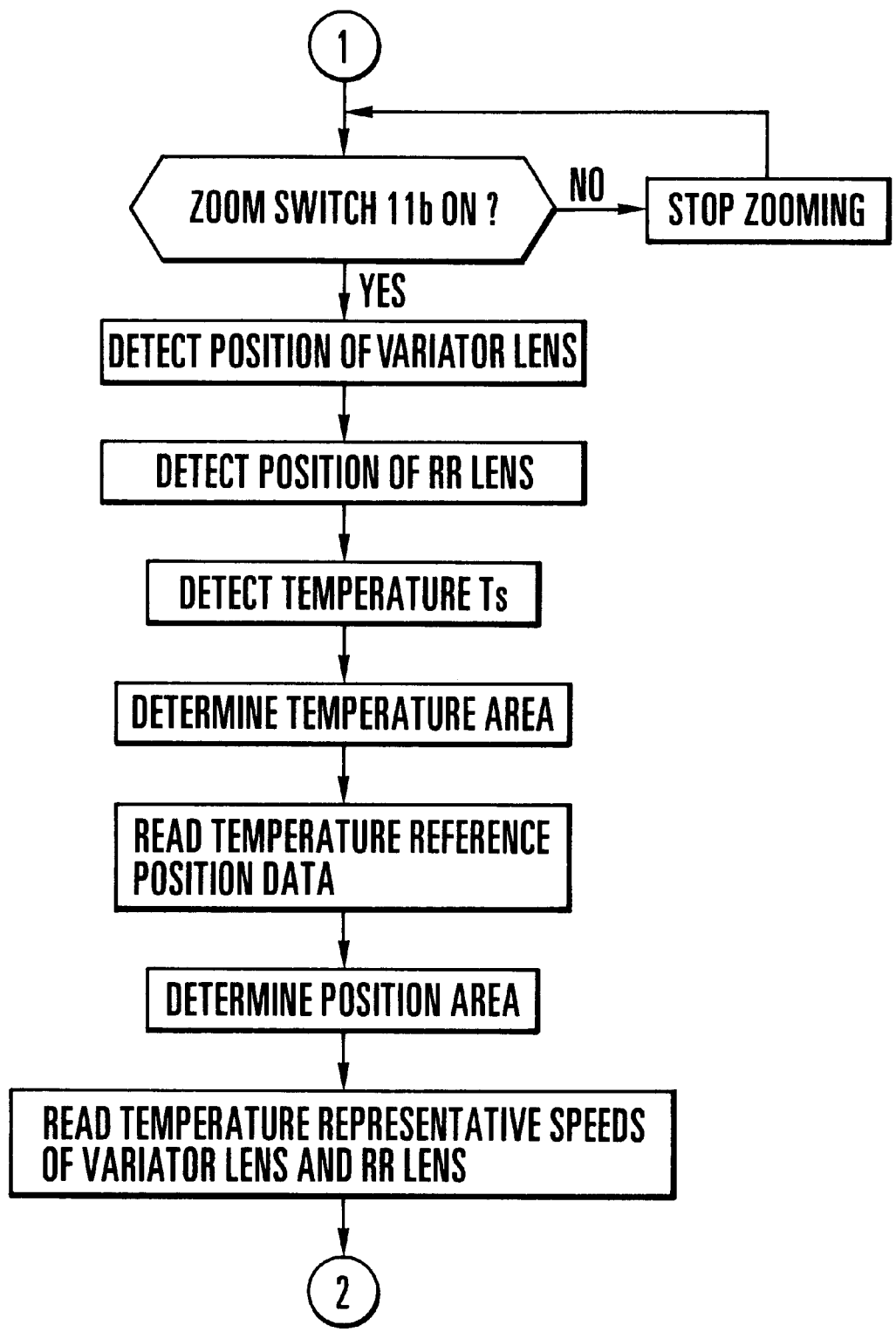
FIG. 5 is a flowchart showing the operation of the first embodiment of the present invention.
Figure 6:
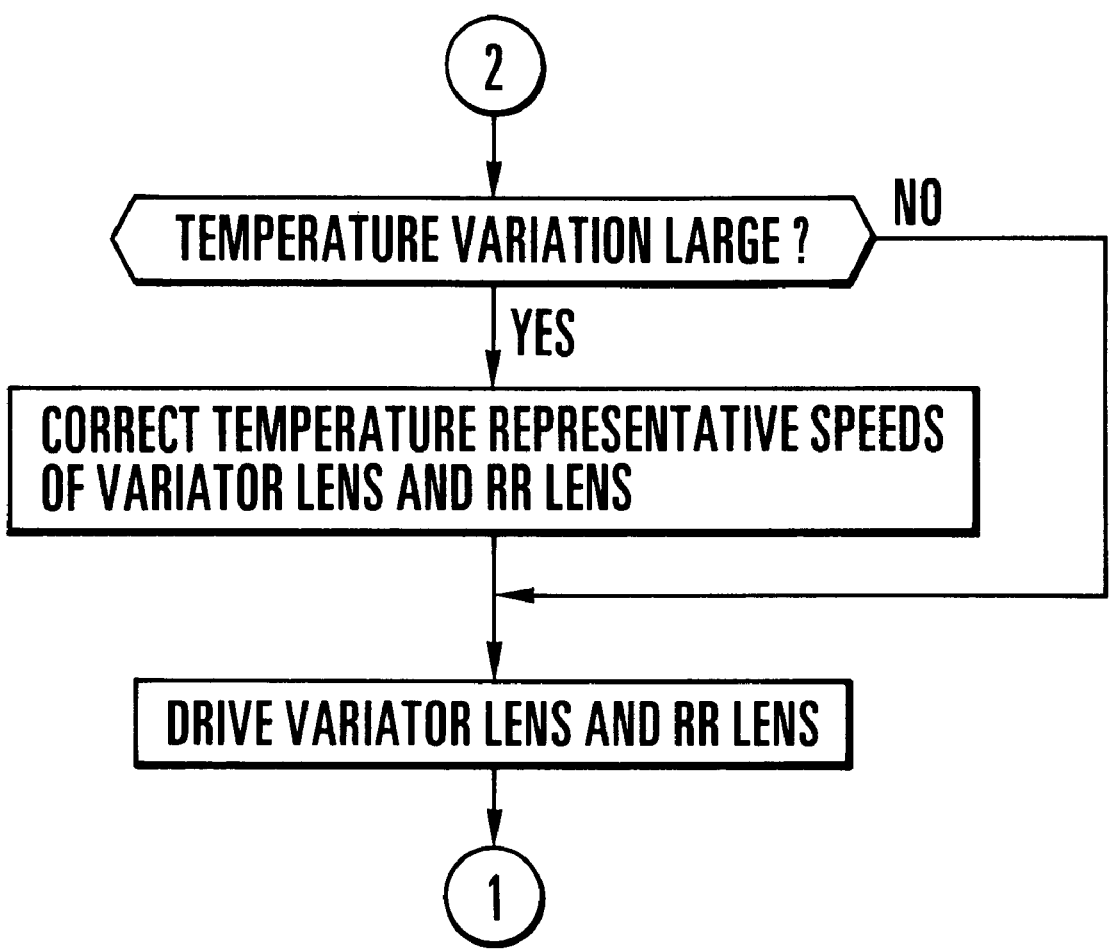
FIG. 6 is a flowchart showing the operation of the first embodiment of the present invention.

The operation of the first embodiment will be described below with reference to the flowcharts shown in FIGS. 4, 5 and 6.

First, the power source 25 is turned on. Then, the control circuit 13 reads the signals outputted from the photointerrupters 8a and 10a through the respective detecting circuits 21 and 23. In the first embodiment, each of the variator lens 102 and the RR lens 104 is driven in a direction corresponding to a respective one of the read signals, i.e., in the direction in which the signal read from the corresponding one of the detecting circuits 21 and 23 goes from its high level to its low level if the level of the signal is high, or in the direction in which the read signal goes from the low level to the high level if the level of the signal is low. The variator lens 102 and the RR lens 104 are driven to move along the optical axis 105 until such variations are detected in the levels of the respective signals outputted from the photointerrupters 8a and 10a.

The positions of the variator lens 102 and the RR lens 104 obtained when the variations are detected in the levels of the signals outputted from the respective photointerrupters 8a and 10a are set as the initial reset positions of the variator lens 102 and the RR lens 104, respectively. Specifically, the variator lens 102 and the RR lens 104 are made to stop at the positions at which the variations are detected in the levels of the aforesaid signals, and counters are cleared which are respectively provided for the variator lens 102 and the RR lens 104 in the control circuit 13. The counters respectively serve to count the numbers of driving pulses for application to the variator lens 102 and the RR lens 104, whereby the distances by which the variator lens 102 and the RR lens 104 have moved from their initial reset positions, i.e., their current positions, are detected.

When the output signal from the thermistor 12 disposed in the vicinity the front lens 101 is inputted to the control circuit 13 through the detecting circuit 24, a temperature Ts at the location where the thermistor 12 is disposed is detected. In the following description, Ts(K) represents a detected temperature which is obtained by the Kth detection after the power source 25 has been turned on. A temperature area corresponding to a detected temperature Ts(1) is determined. Temperature reference position data and temperature reset position data for each of the variator lens 102 and the RR lens 104 which correspond to the detected temperature Ts(1) are read from the ROM 14 and stored in the control circuit 13.

The temperature reset position data are used for correcting the initial reset positions of the variator lens 102 and the RR lens 104 because the initial reset positions at the reference temperature Tref and those at the other temperature Ts deviate from each other owing to expansions or contractions of the mechanical members due to a temperature variation, or depending on the temperature characteristics of the photointerrupters 8a and 10a. If the detected temperature Ts(k) belongs to an area other than an area in which the reference temperature Tref is accommodated, the aforesaid counters are made to perform their counting operations according to the temperature reset position data, whereby the initial reset positions are corrected. Although in the first embodiment the initial reset positions of the variator lens 102 and the RR lens 104 are set outside the aforesaid moving range which is divided into the plurality of areas, they may be set within the moving range. The stored temperature reset position data contains difference values relative to the initial reset position data (which indicate, in the first embodiment, the locations at which the variator lens 102 and the RR lens 104 are positioned when the values of the respective counters the values are "0", and such locations are common to any temperature).

Then, a check is made as to whether the zoom switch 11 is pressed. If the zooming switch 11a is pressed, zooming toward the wide-angle side is executed, while if the zooming switch 11b is pressed, zooming toward the telephoto side is executed. If neither of them is pressed, no zooming operation is executed.

Although the following description refers to a case where zooming toward the telephoto side is executed, the description of zooming toward the wide-angle side is omitted since a substantially identical routine is used.

A position $PV_{(K)}$ of the variator lens 102 is read from the corresponding counter. A position $PRR_{(K)}$ of the RR lens 104 is read from the corresponding counter. The output signal from the thermistor 12 disposed in the vicinity of the front lens 101 is inputted to the control circuit 13 through the detecting circuit 24, and the temperature Ts at the location where the thermistor 12 is disposed is detected. A temperature area corresponding to the temperature Ts is determined.

Temperature reference position data $PV_{Tref}$ and $PRR_{Tref}$ for the variator lens 102 and the RR lens 104 which correspond to the temperature area are read from the ROM 14, and are stored in the control circuit 13. Temperature position data for the variator lens 102:

$$PV_{T(K)} = PV_{(K)} - PV_{Tref}$$

and temperature position data for the RR lens 104:

$$PRR_{T(K)} = PRR_{(K)} - PRR_{Tref}$$

are obtained, thereby determining a position area.

Then, temperature representative speed data $V_{VT(K)}$ and $V_{RRT(K)}$ for the variator lens 102 and the RR lens 104 which correspond to the position area are read from the ROM 14, and are stored in the control circuit 13. In the case of a large temperature variation, the currently stored temperature representative speed data for the variator lens 102 and the RR lens 104 are corrected if the following relationship is satisfied:

$$\Delta T < |Ts(K) - Ts(K-1)|$$

where K represents the current number of times of execution of temperature measurement. Otherwise, the variator lens 102 and the RR lens 104 are driven on the basis of the currently stored temperature representative speed data for the variator lens 102 and the RR lens 104, respectively.

In the first embodiment, $\Delta T$ is set to $\Delta T \leq \Delta GT/2$. The manner of correction is as follows. If the currently stored temperature representative speeds of the variator lens 102 and the RR lens 104 are $V_{VT(K)}$ and $V_{RRT(K)}$, respectively, and the corrected temperature representative speeds of the variator lens 102 and the RR lens 104 are $V^*_{VT(K)}$ and $V^*_{RRT(K)}$, respectively, $$V^*_{VT(K)} = V^*_{VT(K)}$$

$$V^*_{RRT(K)} = V^*_{RRT(K)} + C_a \times (PV_{T(K)} - PV_{T(K-1)})$$

where Ca is an arbitrary constant.

If $V^*_{RRT(K)} > V_{RRMAX}$, the following equations are used:

$$V^*_{VT(K)} = (V^*_{RRmax}/V^*_{RRT(K)}) \times V_{VT(K)}$$

$$V^*_{RRT(K)} = V_{RRmax}$$

where $V_{RRmax}$ represents the maximum speed of the driving means 6.

The variator lens 102 and the RR lens 104 are driven on the basis of the above-described corrected temperature representative speed data.

In the above description, reference has been made to the correcting operation during zooming. A correcting operation during AF (automatic focus detection) will be described below.

The focusing operation of the RFZ lens 1 according to the first embodiment utilizes the systems disclosed in, for example, Japanese Patent Application Nos. Hei 6-82374 and Hei 6-102236. Specifically, the RR lens 104 is made to vibrate in parallel with the optical axis 105, and the RR lens 104 is driven and controlled so that the high-frequency component of a video signal outputted from the CCD 18 during this time can be made closer to a maximum level. This system is called hill-climbing automatic focusing, and although the driving speed of the RR lens 104 is made fast at the foot of a hill, the driving speed is made slow near the top of the hill so that the RR lens 104 can stop on the top of the hill.

However, during an automatic focusing operation, if a temperature variation occurs with respect to a reference temperature area, the top of the hill, i.e., a target position to be reached by the RR lens 104, may move away from or toward the RR lens 104. If the driving means 6 continues to drive the RR lens 104 at a driving speed which is adopted at that time, the RR lens 104 may take an excess time to time to reach the target position, in the case where the target position moves away from the RR lens 104. In the case where the target position moves toward the RR lens 104, the RR lens 104 may overrun the target position.

For this reason, in the first embodiment, the RR lens 104 is driven and controlled by weighting a driving speed $V_{RRAF}$ of the RR lens 104 which corresponds to the reference temperature area, on the basis of the temperature Ts detected from the output of the thermistor 12. If the target position is moving away from the RR lens 104, the driving speed $V_{RRAF}$ is multiplied by an arbitrary constant $C_{af}$ which is greater than 1, while if the target position is moving toward the RR lens 104, the driving speed $V_{RRAF}$ is multiplied by an arbitrary constant $C_{aff}$ which is less than 1.

As described above, according to the arrangement of the first embodiment, not only even if an environmental temperature (constant) at which the optical apparatus is being used deviates from a reference temperature, but also even if a temperature variation occurs during zooming or automatic focusing, it is possible to obtain a good image free from focus deviation.

Although in the first embodiment one thermistor 12 is used as the temperature detecting means, a plurality of thermistors may also be employed. If a plurality of thermistors are used, it is possible to obtain a far better effect.

In the first embodiment, the initial reset positions are corrected according to a temperature variation, but if the amount of correction is small enough to ignore the influence of an image deviation, such correction may not be performed.

Figure 8:
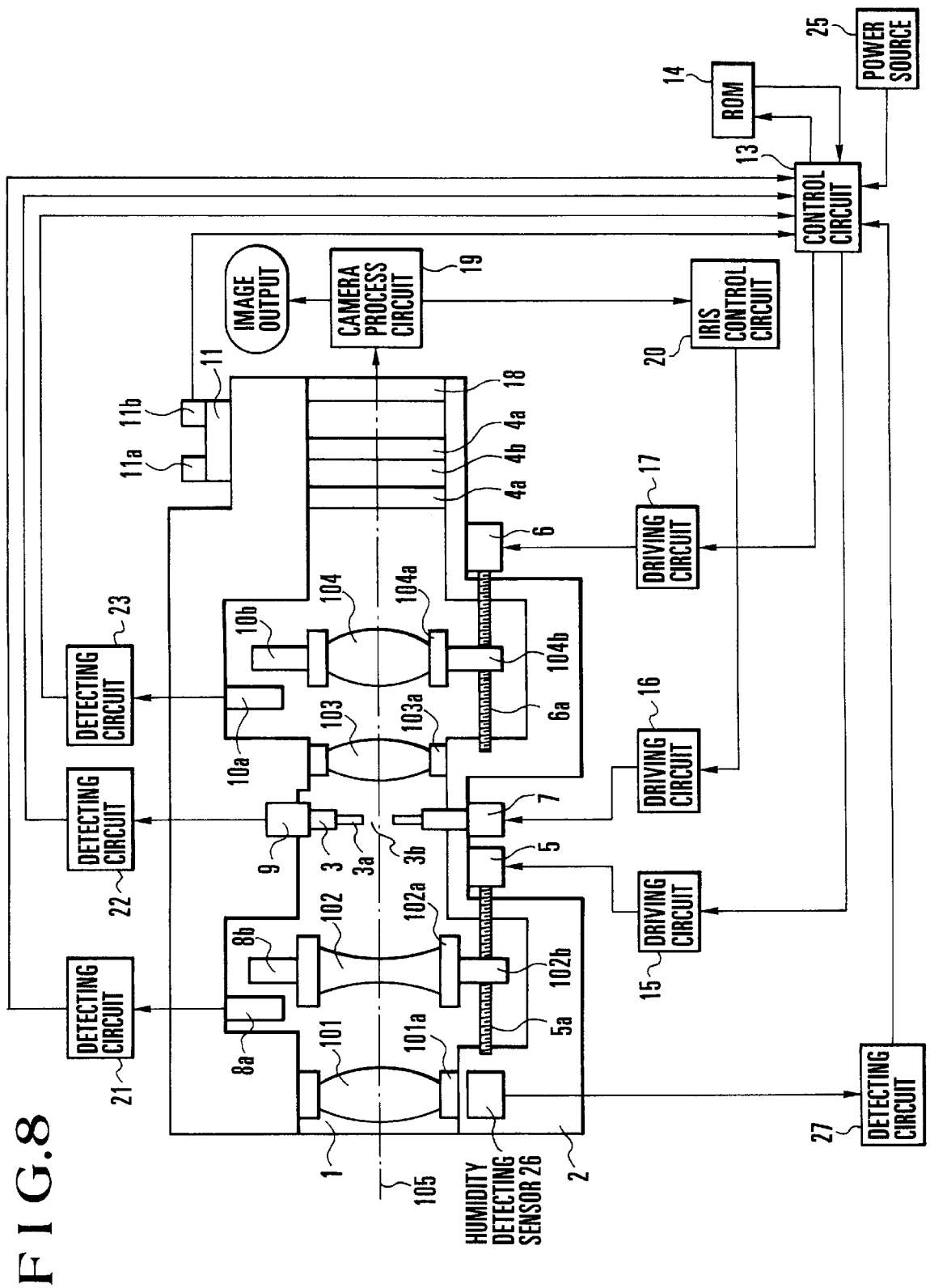
FIG. 8 is a block diagram showing the essential parts of a second embodiment of the present invention.

FIG. 8 is a block diagram showing the essential parts of a second embodiment of the present invention. In FIG. 8, identical reference numerals are used to denote constituent elements identical to those shown in FIG. 1.

The second embodiment is intended to cope with a humidity variation which is another environmental variation. In FIG. 8, reference numeral 26 denotes a humidity detecting sensor which is of an electrostatic-capacitor type or which uses a thermistor. Reference numeral 27 denotes a detecting circuit for detecting humidity from the output of the humidity detecting sensor 26. The detecting circuit 27 outputs to the control circuit 13 an output signal which corresponds to the detected humidity information.

In a manner similar to that which is used for correcting a temperature variation in the first embodiment, the second embodiment corrects focus deviation caused by a variation in the focal length of a plastic lens due to a variation in the shape of the plastic lens or a variation in the index of refraction of the material of the plastic lens which take place when a humidity variation occurs as an environmental variation. In other words, the other basic construction of the second embodiment is identical to that of the first embodiment, in spite of the difference between humidity and temperature.

The operation of the second embodiment will be described below. In the second embodiment, each of the lens groups uses a plastic lens. For this reason, if a humidity variation occurs around the plastic lenses, the shapes of the plastic lenses will vary, so that their focal lengths will vary and the total focal length of the RFZ lens 1 will, therefore, vary. As a result, the position of an image forming plane at this time deviates from the position of the image forming plane at a reference humidity Href (50%, in the second embodiment), i.e., a focus deviation occurs. Accordingly, if a humidity variation occurs in the case of zooming, it is necessary to correct the shape of a dam locus to be traced by each of the moving lens groups, so that the deviation of the image forming plane due to the humidity variation can be corrected.

In the second embodiment, its operating humidity area is divided into local humidity areas by a predetermined humidity range $\Delta G_H$. Humidity reference position data for the variator lens 102 and the RR lens 104 for each of the local humidity areas and humidity representative speed data for the variator lens 102 and the RR lens 104 for each of the position areas are stored in advance in the ROM 14. Accordingly, if a humidity variation occurs, the humidity reference position data for the variator lens 102 and the RR lens 104 are updated and the aforesaid position area is determined from the difference values between the current-position data for the variator lens 102 and the RR lens 104 and the corresponding humidity reference position data for the variator lens 102 and the RR lens 104. Humidity representative speed data for the variator lens 102 and the RR lens 104 which correspond to the position area are read from the ROM 14, and the variator lens 102 and the RR lens 104 are driven and controlled on the basis of the read humidity representative speed data.

The humidity reference position data and the humidity representative speed data which are stored in the ROM 14 are corrected data which take account of the influence of focus deviation caused by variations in the focal lengths of the respective plastic lenses due to a humidity variation with respect to the reference humidity Href. Such data are corrected and calculated by taking account of the differences between the humidity detected by the humidity detecting sensor 26 and the actual humidity of the plastic lenses. This is intended to take account of the positions of each of the lenses, i.e., the phenomenon in which, for example, a lens disposed near the CCD 18 may be exposed to a low degree of humidity as compared with, for example, the front lens 101.

In the above description, reference has been made to the correcting operation during zooming. A correcting operation during AF will be described below.

The focusing operation of the RFZ lens 1 according to the second embodiment is similar to that described previously in connection with the first embodiment. Specifically, the RR lens 104 is made to vibrate in parallel with the optical axis 105, and the RR lens 104 is driven and controlled so that the high-frequency component of a video signal outputted from the CCD 18 during this time can be made closer to a maximum level. This system is called hill-climbing automatic focusing, and although the driving speed of the RR lens 104 is made fast at the foot of a hill, the driving speed is made slow near the top of the hill so that the RR lens 104 can stop on the top of the hill.

However, during an automatic focusing operation, if a humidity variation occurs, the top of the hill, i.e., a target position to be reached by the RR lens 104, may move away from or toward the RR lens 104. If the driving means 6 continues to drive the RR lens 104 at a driving speed which is adopted at that time, the RR lens 104 may take an excess time to reach the target position, in the case where the target position moves away from the RR lens 104. In the case where the target position moves toward the RR lens 104, the RR lens 104 may overrun the target position.

For this reason, in the second embodiment, the RR lens 104 is driven and controlled by weighting a reference driving speed $V_{HRRAF}$ of the RR lens 104 on the basis of the humidity Hs detected from the output of the humidity detecting sensor 26. If the target position is moving away from the RR lens 104, the driving speed $V_{HRRAF}$ is multiplied by an arbitrary constant $C_{Haf}$ which is greater than 1, while if the target position is moving toward the RR lens 104, the driving speed $V_{HRRAF}$ is multiplied by an arbitrary constant $C_{Haff}$ which is less than 1.

As described above, according to the arrangement of the second embodiment, not only even if an environmental humidity (constant) at which the optical apparatus is being used deviates from a reference humidity, but also even if a humidity variation occurs during zooming or automatic focusing, it is possible to obtain a good image free from focus deviation.

Although in the second embodiment one humidity detecting sensor 26 is used, a plurality of humidity detecting sensors may also be employed. If a plurality of humidity detecting sensors are used, it is possible to obtain a far better effect.

Although the above-described first and second embodiments are respectively provided with temperature detecting means and humidity detecting means, both of the temperature and humidity detecting means may be provided in one optical apparatus so that focus deviation due to both temperature variation and humidity variation can be corrected by using the methods described above in connection with the respective embodiments.

What is claimed is:

1. An optical apparatus comprising:
    a first lens for varying magnification;
    a second lens, positioned on a focal-plane side of said first lens, for correcting a variation in an image forming position;
    a first detection device for detecting at least one of temperature and humidity;
    a second detection device for detecting the positions of both said first and second lenses;
    a moving device positioned and configured to move said first and second lenses wherein said moving device moves said first and second lenses before zooming until said second detection device detects that said first and second lenses are at an initial reset position so that said first and second lenses stop at the initial reset position before zooming;
    wherein said moving device corrects the initial reset position of said first and second lenses before zooming in accordance with the detection of said first detection device, and
    a control device for controlling movement of said second lens during movement of said first lens by using outputs of both said first and second detection devices, said control device extracting, from a memory storing correction information of the movement of said second lens, the correction information of at least one of temperature and humidity, and controlling the movement of said second lens using the extracted correction information,
    wherein said control device controls the movement speed of said second lens using the extracted correction information at a standard temperature or humidity and changes the movement speed of said second lens when the temperature or humidity changes.

2. An optical apparatus according to claim 1, wherein said control device controls a movement position of said second lens using the extracted correction information.

3. An optical apparatus according to claim 1, said first detection device having a thermistor for detecting temperature.

4. An optical apparatus according to claim 1, said first detection device having a capacitance sensor for detecting humidity.

5. An optical apparatus according to claim 1, further comprising an image forming optical system including said first and second lenses, said image forming optical system including a plastic lens.

6. An optical apparatus according to claim 1, further comprising an image forming optical system including said first and second lenses, said image forming optical system including a plastic lens.

7. An optical apparatus according to claim 2, further comprising an image forming optical system including said first and second lenses, said image forming optical system including a plastic lens.

8. An optical apparatus according to claim 1, wherein said memory stores a predetermined movement information for correcting said second lens during the movement of said first lens at at least one of a predetermined temperature and a predetermined humidity, and said control device corrects the movement information based on an output of said first detection device.

9. An optical apparatus according to claim 1, said second detection device detecting a position of said first lens from a movement amount relative to a reset position of said first lens.

10. An optical apparatus according to claim 1, said second detection device detecting a position of said second lens from a movement amount relative to a reset position of said second lens.

11. An optical apparatus according to claim 1, wherein said memory stores the correction information for each position of said first and second lens.

12. An optical apparatus according to claim 2, wherein said memory stores the correction information for each position of said first and second lens.

13. An optical apparatus comprising:

a first lens for varying magnification;

a second lens, positioned on an image-forming-plane side of said first lens, for correcting deviation of an image forming position caused by movement of said first lens;

a first detection device for detecting at least one of temperature and humidity;

a second detection device for detecting positions of each of said first and second lenses, a memory storing correction information of at least one of temperature and humidity, a device configured and positioned to move said first and second lenses, wherein said moving device moves said first and second lenses before zooming until said second detection device detects that said first and second lenses are at an initial reset position so that said first and second lenses stop at the initial reset position before zooming;

wherein said moving device corrects the initial reset position of said first and second lenses before zooming in accordance with the detection of said first detection device, by extracting from said memory a specific correction information based on the output of said first detection device.

14. An optical apparatus according to claim 13, further comprising a drive source having a stepping motor, said drive source moving said second lens, and said second detection device detecting the position of said second lens from a number of drive steps of said stepping motor from the reset position.

15. An optical apparatus according to claim 13, said first detection device having a thermistor for detecting temperature.

16. An optical apparatus according to claim 13, said first detection device having a capacitance sensor for detecting humidity.

17. An optical apparatus according to claim 13, further comprising an image forming optical system including said first and second lenses, said image forming optical system including a plastic lens.

* * * * *

UNITED STATES PATENT AND TRADEMARK OFFICE
CERTIFICATE OF CORRECTION

PATENT NO. : 6,144,805
DATED : November 7, 2000
INVENTOR(S) : Shigeru Ogino

Page 1 of 1

It is certified that error appears in the above-identified patent and that said Letters Patent is hereby corrected as shown below:

Column 3,
Line 1, "plurality" should read -- plurality of --.

Column 10,
Line 4, "time to" should be deleted.

Column 11,
Line 3, "dam" should read -- cam --.

Signed and Sealed this

Fourth Day of December, 2001

Attest:

*Nicholas P. Godici*

NICHOLAS P. GODICI
*Attesting Officer*   *Acting Director of the United States Patent and Trademark Office*